United States Patent
Styles et al.

(10) Patent No.: US 10,578,048 B2
(45) Date of Patent: Mar. 3, 2020

(54) WIDE RANGE ACTIVE COMPRESSOR FOR HP-EGR ENGINE SYSTEMS

(71) Applicant: Ford Global Technologies, LLC, Dearborn, MI (US)

(72) Inventors: Daniel Joseph Styles, Canton, MI (US); Eric Curtis, Milan, MI (US); David Hanna, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/871,651

(22) Filed: Jan. 15, 2018

(65) Prior Publication Data
US 2019/0218981 A1    Jul. 18, 2019

(51) Int. Cl.
| F02D 41/00 | (2006.01) |
| F02D 43/00 | (2006.01) |
| F02M 26/05 | (2016.01) |
| F02D 41/14 | (2006.01) |
| F02B 37/16 | (2006.01) |
| F02B 37/22 | (2006.01) |
| F02B 37/24 | (2006.01) |

(52) U.S. Cl.
CPC ............ *F02D 43/00* (2013.01); *F02B 37/162* (2019.05); *F02B 37/225* (2013.01); *F02B 37/24* (2013.01); *F02D 41/005* (2013.01); *F02D 41/0007* (2013.01); *F02D 41/0065* (2013.01); *F02D 41/0077* (2013.01); *F02D 41/1448* (2013.01); *F02M 26/05* (2016.02)

(58) Field of Classification Search
CPC .............. F02B 37/225; F02B 2037/122; F02B 2037/125; F02B 2037/162; F02B 37/127
See application file for complete search history.

(56) References Cited

U.S. PATENT DOCUMENTS

| 4,930,978 | A | * | 6/1990 | Khanna | ............... F04D 29/4213 |
| | | | | | 415/58.3 |
| 4,930,979 | A | * | 6/1990 | Fisher | ................ F04D 29/4213 |
| | | | | | 415/206 |
| 4,990,053 | A | * | 2/1991 | Rohne | ................... F04D 29/685 |
| | | | | | 415/58.4 |
| 5,246,335 | A | * | 9/1993 | Mitsubori | ........... F04D 29/4213 |
| | | | | | 415/214.1 |
| 6,360,541 | B2 | | 3/2002 | Waszkiewicz et al. | |
| 6,447,241 | B2 | * | 9/2002 | Nakao | ................ F04D 29/4213 |
| | | | | | 415/1 |
| 6,460,522 | B1 | | 10/2002 | Rimnac | |

(Continued)

FOREIGN PATENT DOCUMENTS

WO    2016134584 A1    9/2016

*Primary Examiner* — Kevin R Steckbauer
(74) *Attorney, Agent, or Firm* — Geoffrey Brumbaugh; McCoy Russell LLP (57) ABSTRACT

Methods and systems are provided for an engine system configured with a wide range active compressor and high pressure EGR. In one example, a compressor may include an active casing treatment with a slideable sleeve may be adjusted to direct air flow through either a choke slot and surge slot to control compressor efficiency, thereby maintaining EGR flow. In another example, the compressor may comprise a variable inlet device to regulate air flow through the compressor, thereby adjusting compressor efficiency and also maintaining EGR flow.

16 Claims, 6 Drawing Sheets

FIG. 2A

(56) References Cited

U.S. PATENT DOCUMENTS

| | | | | |
|---|---|---|---|---|
| 6,470,864 B2* | 10/2002 | Kim | | F02B 37/005 |
| | | | | 123/568.12 |
| 6,623,239 B2* | 9/2003 | Sahay | | F02B 37/16 |
| | | | | 415/11 |
| 6,648,594 B1* | 11/2003 | Horner | | F04D 25/04 |
| | | | | 415/144 |
| 6,699,008 B2* | 3/2004 | Japikse | | F04D 27/0207 |
| | | | | 415/144 |
| 7,775,759 B2* | 8/2010 | Sirakov | | F04D 29/4213 |
| | | | | 415/1 |
| 8,061,974 B2* | 11/2011 | Gu | | F04D 27/0207 |
| | | | | 415/145 |
| 8,210,793 B2* | 7/2012 | Hale | | F02C 1/005 |
| | | | | 415/151 |
| 8,414,249 B2* | 4/2013 | Nikpour | | F04D 17/025 |
| | | | | 415/1 |
| 8,517,664 B2 | 8/2013 | Sun et al. | | |
| 8,522,549 B2* | 9/2013 | Sumser | | F04D 29/685 |
| | | | | 415/205 |
| 8,690,522 B2* | 4/2014 | Nikpour | | F04D 17/025 |
| | | | | 415/143 |
| 8,696,299 B2* | 4/2014 | Bywater | | F02B 37/16 |
| | | | | 415/1 |
| 8,845,268 B2* | 9/2014 | Nikpour | | F04D 17/025 |
| | | | | 415/143 |
| 8,904,787 B2 | 12/2014 | Styles et al. | | |
| 8,926,264 B2* | 1/2015 | Ring | | F04D 27/0207 |
| | | | | 415/145 |
| 9,732,756 B2* | 8/2017 | An | | F02B 37/225 |
| 9,909,490 B2* | 3/2018 | Hand, III | | F02D 41/1448 |
| 9,926,867 B1* | 3/2018 | Schum | | F02M 26/05 |
| 9,932,885 B2* | 4/2018 | Devine | | F02C 6/12 |
| 10,107,297 B2* | 10/2018 | Kumar | | F04D 27/0246 |
| 2001/0035171 A1* | 11/2001 | Kim | | F02B 37/005 |
| | | | | 123/568.12 |
| 2009/0060708 A1* | 3/2009 | Hale | | F02C 1/005 |
| | | | | 415/58.2 |
| 2010/0061840 A1* | 3/2010 | Gu | | F04D 27/0207 |
| | | | | 415/145 |
| 2011/0002770 A1* | 1/2011 | Bywater | | F02B 37/16 |
| | | | | 415/1 |
| 2013/0058762 A1* | 3/2013 | Ring | | F04D 27/0207 |
| | | | | 415/144 |
| 2014/0377051 A1 | 12/2014 | Sun et al. | | |
| 2015/0192133 A1* | 7/2015 | An | | F02B 37/225 |
| | | | | 415/203 |
| 2016/0222875 A1* | 8/2016 | Hall | | F02C 6/12 |
| 2017/0227013 A1* | 8/2017 | Kumar | | F04D 27/0246 |
| 2017/0276067 A1* | 9/2017 | Hand, III | | F02D 41/1448 |
| 2018/0340544 A1* | 11/2018 | Hanna | | F04D 27/0246 |
| 2018/0355790 A1* | 12/2018 | Smiljanovski | | F02D 9/1055 |
| 2019/0024574 A1* | 1/2019 | Upadhyay | | F02B 37/004 |
| 2019/0024576 A1* | 1/2019 | Van Nieuwstadt | | F02B 37/004 |
| 2019/0078586 A1* | 3/2019 | Zeng | | F04D 29/462 |
| 2019/0078587 A1* | 3/2019 | Zeng | | F04D 29/464 |
| 2019/0226390 A1* | 7/2019 | McConville | | F02B 37/10 |

\* cited by examiner

WIDE RANGE ACTIVE COMPRESSOR FOR HP-EGR ENGINE SYSTEMS

FIELD

The present description relates generally to methods and systems for controlling a vehicle engine to increase EGR flow.

BACKGROUND/SUMMARY

The implementation of increasingly stringent regulations on emissions released by internal combustion engines has encouraged development of technological advances in engine configuration. Such improvements have assisted in a reduction in the release of combustion products and other byproducts to the atmosphere while maintaining and often improving engine performance. For example, by incorporating a turbocharger, a vehicle's efficiency and power output may be increased.

Turbochargers forcibly induct extra air into combustion chambers of the engine, resulting in ignition of additional air to maintain combustion stoichiometry, thus producing more power than achieved by delivery of intake air at ambient pressure. Turbochargers typically comprise a compressor driven by a turbine via a connecting drive shaft. The rotation of the turbine is often powered by rapidly expanding exhaust gas generated at the combustion chambers, a portion of which is channeled to the turbine to drive the boosting of intake air. The spent exhaust gas is then treated by an after treatment device, such as a catalytic converter, to remove emissions before releasing the exhaust gas to the environment.

A portion of the exhaust gas flow may also be diverted from an engine exhaust to an engine intake manifold in engines configured with exhaust gas recirculation systems (EGR). The recycling of the exhaust gas provides a desired engine dilution which reduces engine knock, in-cylinder heat losses, throttling losses, as well as NOx emissions. In turbocharged diesel engines, EGR may significantly reduce the formation of NOx by lowering the peak combustion temperature at the cylinders. Since the exhaust gas flow is divided between the EGR system and turbine rotation, the turbocharger is often a variable geometry turbocharger (VGT). The use of the VGT allows for control over the flow of exhaust gas into the turbine nozzle by varying the geometry of the nozzle, thereby controlling the amount of exhaust gas available for EGR as well as engine dilution.

A high pressure EGR (HP-EGR) system relies on a negative pressure differential (e.g., exhaust pressure greater than intake pressure) at the engine during low engine speed operations in order to promote EGR flow. When EGR gas displaces some of the boosted ambient air normally ingested into the engine, increased boosting of intake air is induced to maintain appropriate air/fuel ratios for combustion efficiency. To accommodate higher boost levels, the VGT vanes may be adjusted to a more closed position. The velocity of the gas flow increases, providing more power to the turbine. By reducing the area of flow through the VGT vanes, pressure upstream of the turbine is increased, promoting EGR flow.

Thus, the EGR flow may be controlled by the vane position of the VGT. The vanes may be adjusted to reduce the level of NOx in the exhaust gas to a desired level and results in the delivery of charge air in amounts sufficient to maintain target air/fuel ratios in the engine. One example of a boosted engine adapted with a VGT and an EGR system is shown by Rimnac in U.S. Pat. No. 6,460,522. Therein, a method and apparatus for controlling EGR is disclosed including the VGT in communication with the EGR system and a first rotary electric actuator controlling the position of the VGT. A second rotary electric actuator is operatively connected to an EGR valve for further control of the EGR flow.

However, the inventors herein have recognized potential issues with such systems. As one example, VGTs and turbochargers in general have become increasingly efficient and less turbine power is needed to meet boost demand. The higher efficiency of the VGT results in the maintaining of the VGT vanes in a more open position where the gaps between the vanes are widened in comparison to the VGT vane position of a less efficient VGT. The more open position of the VGT vanes allows increased air flow through the turbine nozzle, reducing the pressure in the exhaust passage upstream of the turbine. Consequently, the pressure differential driving EGR flow is diminished, adversely affecting the beneficial effects of the EGR system as described above. Attempts to reinforce the negative pressure differential using engine throttling to increase vacuum at the intake manifold or incorporating a pump in the EGR passage leads to poor fuel economy of the vehicle.

In one example, the issues described above may be addressed by a method for decreasing compressor efficiency and increasing a pressure differential between an exhaust system upstream of a turbine and an intake system downstream of a compressor and, responsive to increasing the pressure differential, opening an exhaust gas recirculation (EGR) valve to flow exhaust gas from the exhaust system to the intake system. In this way, EGR flow may be maintained without throttling the engine, at least during some conditions, thus avoiding additional fuel consumption.

As one example, a wide range active compressor (WRAC) may be configured with an active casing treatment including a surge slot and a choke slot. The surge slot and choke slot may be alternatively opened and closed in response to driving routines and engine speeds. During vehicle operation at low engine speeds, the surge slot is usually maintained open, allowing recirculation of air from an impeller to an intake passage of the compressor inlet. The recirculating flow alleviates pressure accumulation at an outlet end of the compressor, increasing compressor efficiency. In contrast, by opening the choke slot during low engine speeds, pressure buildup at the compressor outlet slows the rotation of the turbine, allowing pressure upstream of the turbine to increase. Compressor efficiency is reduced and EGR flow is improved.

Alternatively, the WRAC may also comprise a variable inlet device that regulates flow into the compressor inlet by varying the inlet diameter. During compressor operation under light loads, e.g., low mass flow, the variable inlet device is often adjusted to decrease the diameter of the compressor inlet to restrict flow and prevent compressor surge. By opening the variable inlet device and increasing the diameter of the compressor inlet, compressor efficiency may also be reduced, enhancing EGR flow.

By configuring a WRAC with an active casing treatment or variable inlet device, the compressor efficiency may be modulated to increase the pressure gradient in the engine for EGR flow. In this way, the pressure differential between the exhaust manifold and intake manifold may be controlled by the adjustment of compressor inlet air flow by the variable inlet device to decrease boost pressure or by the direction of additional flow through the compressor inlet as determined by the positioning of the active casing treatment.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 2A-3B are shown approximately to scale

DETAILED DESCRIPTION

Figure 1:
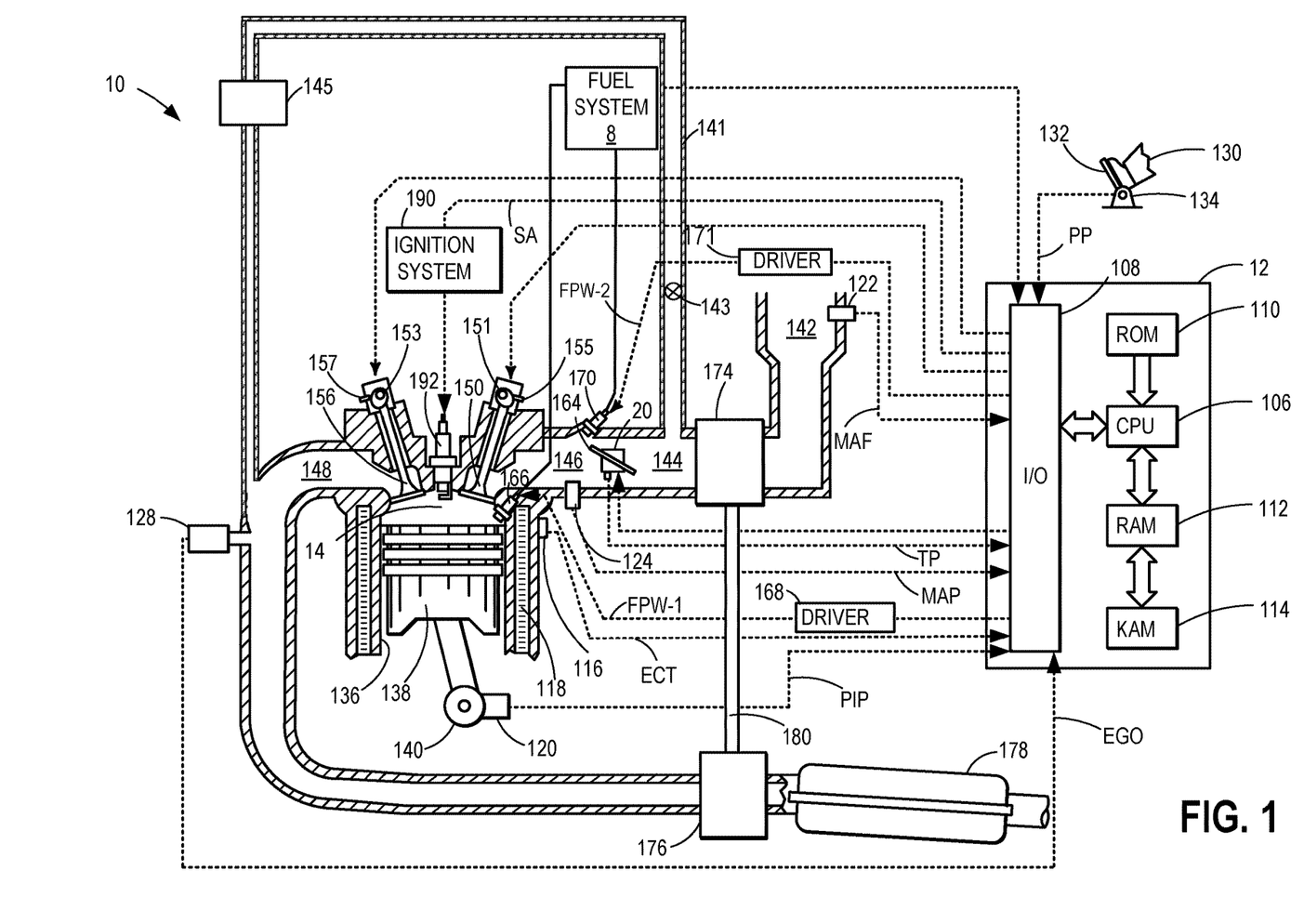
FIG. 1 shows an example engine system for a vehicle including EGR.
Figure 2A:
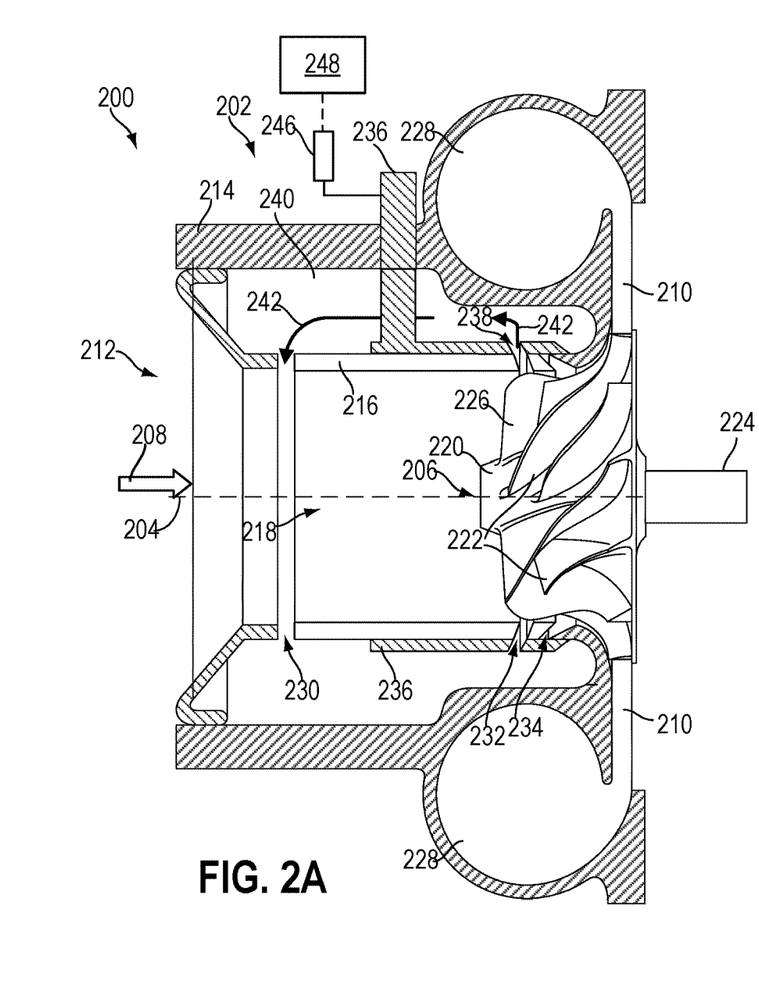
FIG. 2A shows a cut-away view of a wide range active compressor adapted with an active casing treatment in a first position.
Figure 2B:
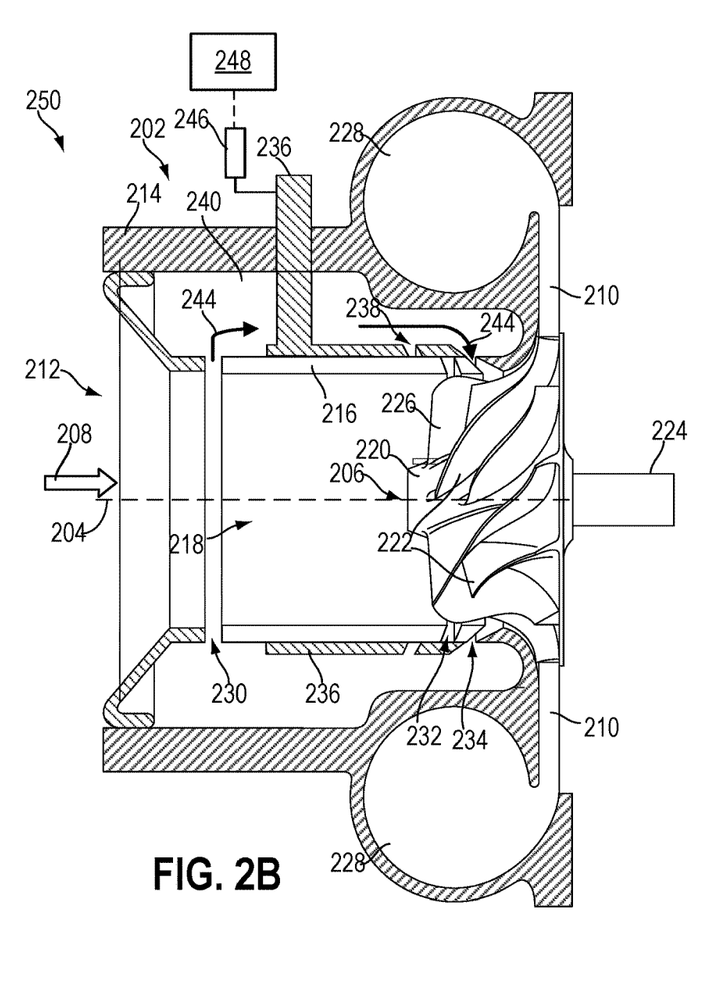
FIG. 2B shows a cut-away view of a wide range active compressor adapted with an active casing treatment in a second position.
Figure 3A:
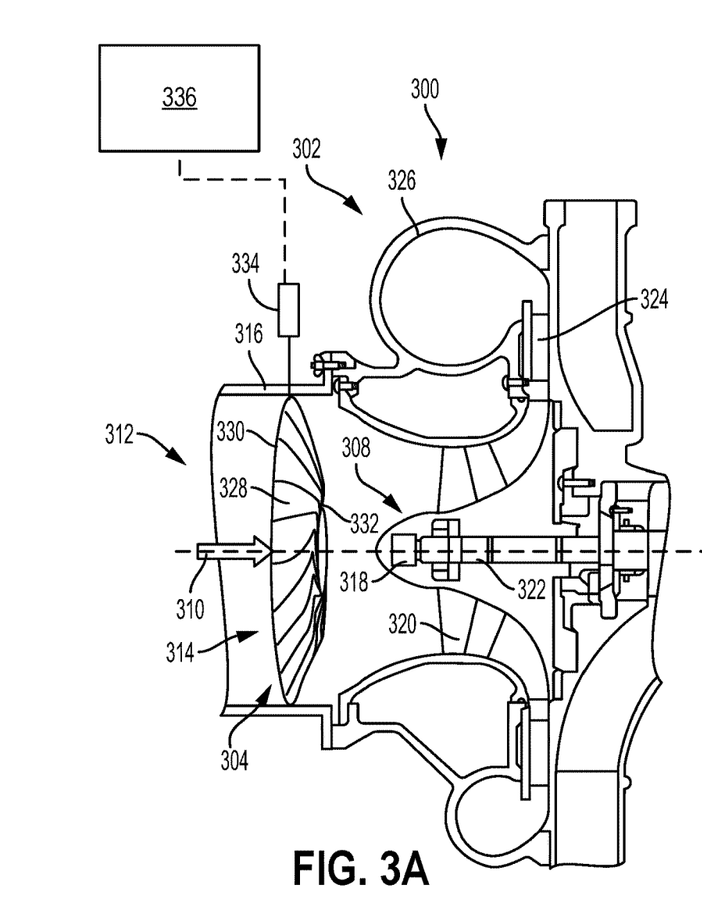
FIG. 3A shows a cut-away view of a wide range active compressor adapted with a variable inlet device in a closed position.
Figure 3B:
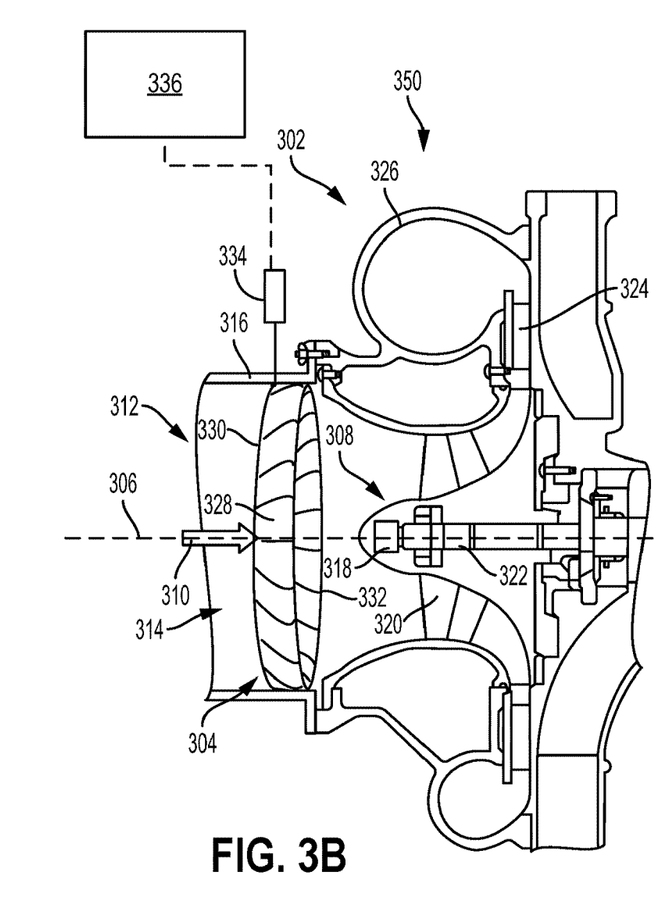
FIG. 3B shows a cut-away view of a wide range active compressor adapted with a variable inlet device in an open position.
Figure 5:
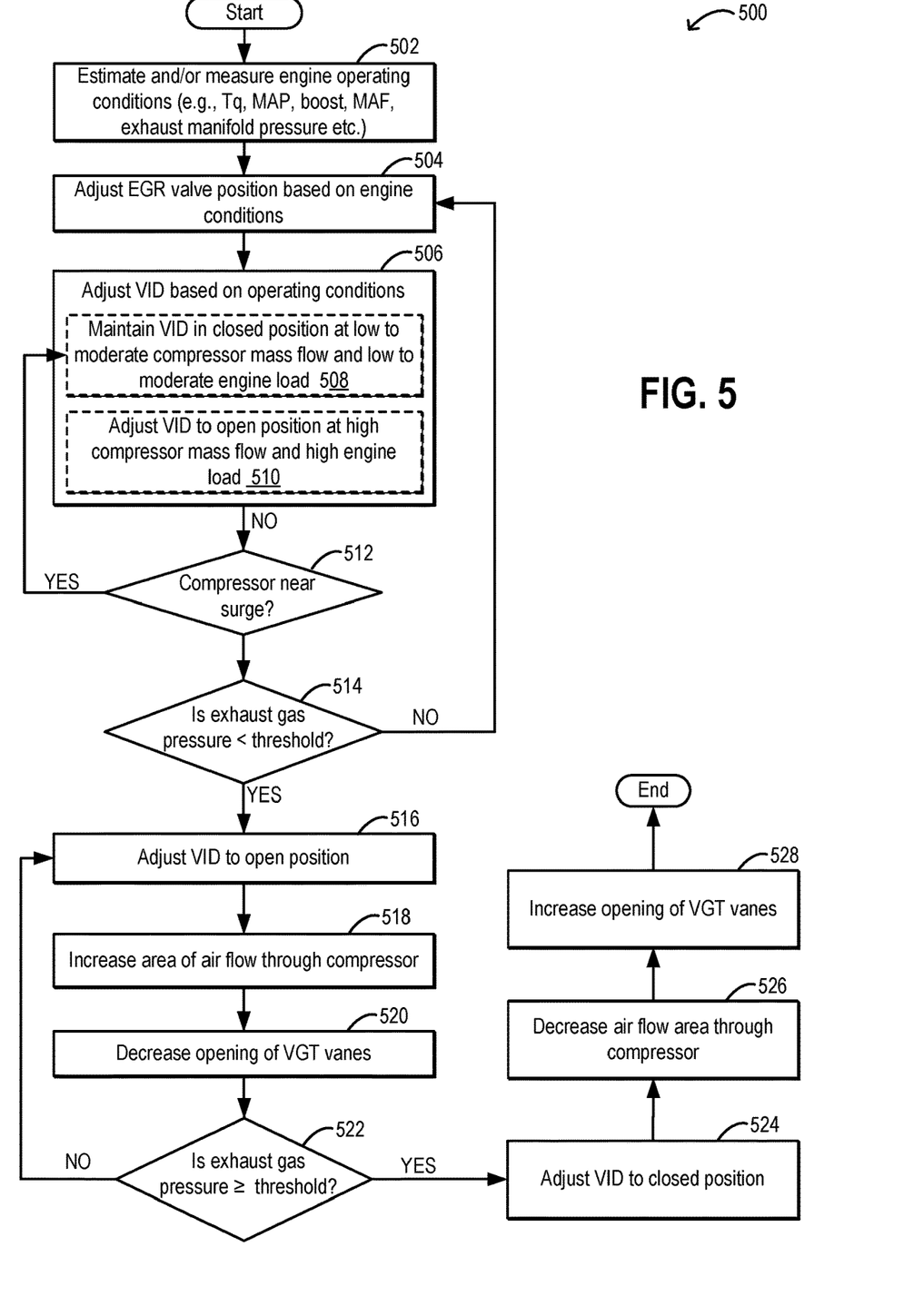
FIG. 5 is a flow chart of a second example method for operation of an engine system adapted with a wide range active compressor and a HP-EGR system.
Figure 6:
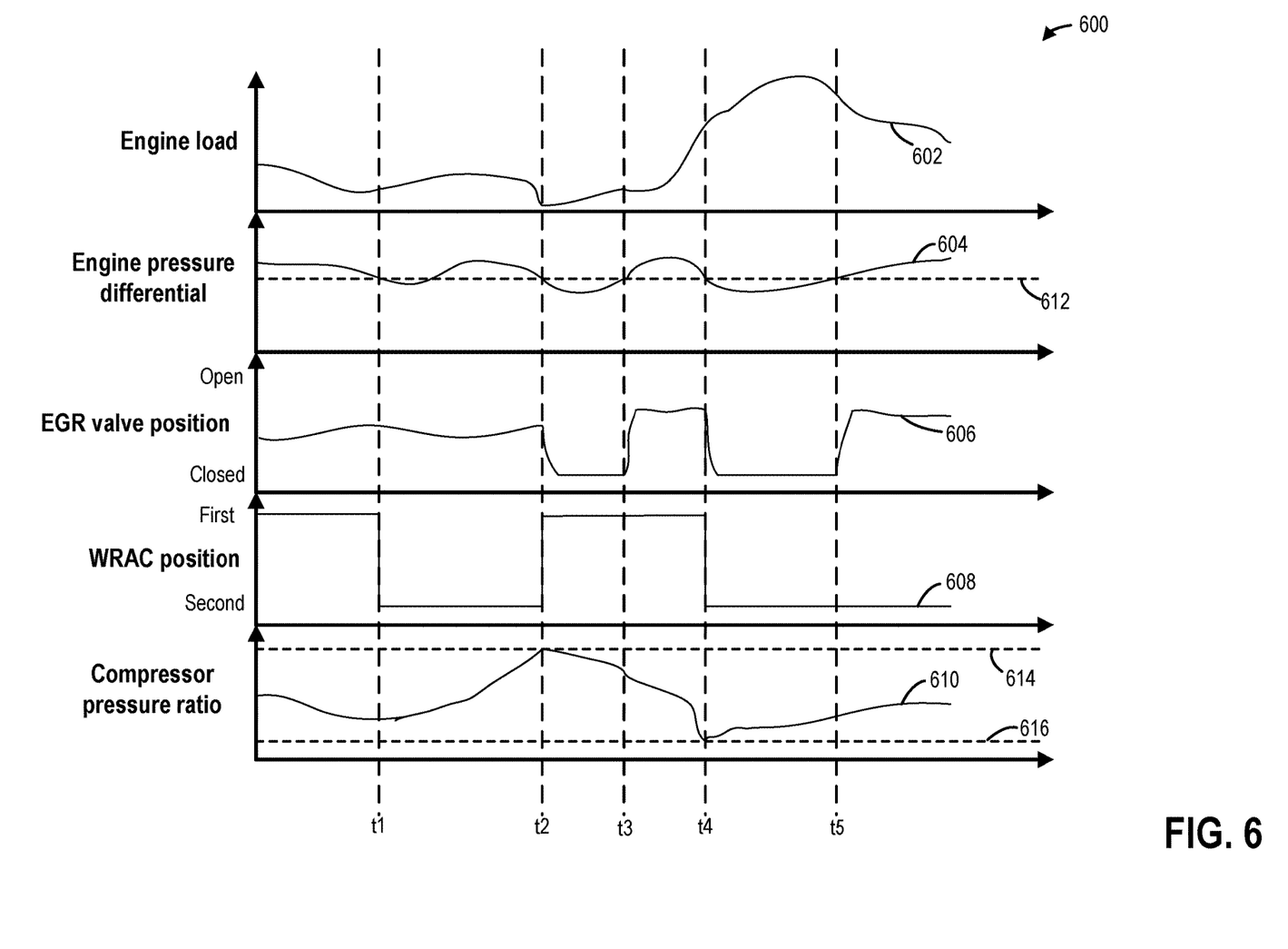
FIG. 6 is an example operational map of an engine system showing the operation of a wide range active compressor.

The following description relates to systems and methods for an engine system adapted with a wide range active compressor (WRAC) and a high pressure exhaust gas recirculation (HP-EGR) system. An engine system diagram is illustrated in FIG. 1 showing an arrangement of a HP-EGR pathway and a turbocharger relative to a combustion chamber. A cut-away view of a WRAC is shown in FIGS. 2A-2B. An active casing of the WRAC is adjusted to be open to flow air through a surge slot in FIG. 2A while the active casing is actuated to open a choke slot and block the surge slot in FIG. 2B. Another embodiment of a WRAC is shown in FIGS. 3A-3B with a variable inlet device disposed in the compressor inlet. The variable inlet device is shown in a closed position in FIG. 3A to restrict flow through the WRAC and in an open position in FIG. 3B to maximize air flow. A flow chart outlining a first example method of operation of the WRAC comprising an active casing treatment where the flow through either the surge slot or choke slot is adjusted based on engine speed is provided in FIG. 4. In FIG. 5, a flow chart describing a second example of an operating method of the WRAC adapted with a variable inlet device is depicted, with the actuation of the variable inlet device determined by compressor load. An example operational map for adjustment of a WRAC in conjunction with an EGR valve of a HP-EGR system in response to engine operating conditions is depicted in FIG. 6.

FIG. 1 depicts an example embodiment of a combustion chamber or cylinder of internal combustion engine 10 which may be a turbocharged diesel engine. Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. Cylinder (herein also "combustion chamber') 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake air passages 142, 144, and 146. Intake air passage 146 may communicate with other cylinders of engine 10 in addition to cylinder 14. In some embodiments, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be a wide range active compressor (WRAC) and at least partially powered by exhaust turbine 176 via a shaft 180 where the boosting device is configured as a turbocharger. The turbocharger may be a variable geometry turbocharge (VGT) where exhaust turbine 176 may include guiding vanes arranged in a nozzle of the turbine. Gas flow into the exhaust turbine 176 may be adjusted by varying a position of the guiding vanes. A throttle 20 including a throttle plate 164 may be provided along an intake passage of the engine for varying the flow rate and/or pressure of intake air provided to the engine cylinders. For example, throttle 20 may be disposed downstream of compressor 174 as shown in FIG. 1, or alternatively provided upstream of compressor 174.

Exhaust passage 148 may receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Exhaust temperature may be measured by one or more temperature sensors (not shown) located in exhaust passage 148. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The operation of intake valve 150 and exhaust valve 156 may be determined by valve position sensors (not shown) and/or camshaft position sensors 155 and 157, respectively. In alternative embodiments, the intake and/or exhaust valve may be controlled by electric valve actuation. For example, cylinder 14 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

As a non-limiting example, cylinder 14 is shown including two fuel injectors 166 and 170. Fuel injector 166 is configured to deliver diesel or gasoline to the combustion chamber from fuel system 8 via a high pressure fuel pump, and a fuel rail. Alternatively, fuel may be delivered by a single stage fuel pump at lower pressure, in which case the timing of the direct fuel injection may be more limited during the compression stroke than if a high pressure fuel system is used. Further, the fuel tank may have a pressure transducer providing a signal to controller 12.

Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter referred to as "DI") of fuel into combustion cylinder 14. While FIG. 1 shows injector 166 positioned to one side of cylinder 14, it may alternatively be located overhead of the piston, such as near the position of spark plug 192. Such a position may improve mixing and combustion when operating the engine with an alternative, alcohol-based fuel due to the lower volatility of some alcohol-based fuels. Alternatively, the injector may be located overhead and near the intake valve to improve mixing.

Fuel injector 170 is shown arranged in intake passage 146, rather than in cylinder 14, in an optional configuration that provides what is known as port injection of fuel (hereafter referred to as "PFI") into the intake port upstream of cylinder 14. Fuel injector 170 may inject fuel such as gasoline, received from fuel system 8, in proportion to the pulse width of signal FPW-2 received from controller 12 via electronic driver 171. Note that a single driver 168 or 171 may be used for both fuel injection systems, or multiple drivers, for example driver 168 for fuel injector 166 and driver 171 for fuel injector 170, may be used, as depicted.

As described above, FIG. 1 shows only one cylinder of a multi-cylinder engine. As such each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

The engine may further include one or more exhaust gas recirculation passages for recirculating a portion of exhaust gas from the engine exhaust to the engine intake. As such, by recirculating some exhaust gas, an engine dilution may be affected which may improve engine performance by reducing engine knock, peak cylinder combustion temperatures and pressures, throttling losses, and NOx emissions. In the depicted embodiment, exhaust gas may be recirculated from exhaust passage 148 to intake passage 144 via EGR passage 141. The amount of EGR provided to intake passage 148 may be varied by controller 12 via EGR valve 143. Further, an EGR sensor 145 may be arranged within the EGR passage and may provide an indication of one or more pressure, temperature, and oxygen concentration of the exhaust gas. In some examples, the sensor 145 may be an EGR pressure feedback sensor that operates in conjunction with the EGR valve 143 to regulate the pressure of a high pressure EGR (HP-EGR) system.

When EGR valve 143 is open, a portion of the exhaust gas generated at the cylinder 14 is diverted to the EGR passage 141, decreasing the amount of exhaust gas driving the rotation of the turbine 176. A pressure in the EGR passage is detected by the EGR pressure feedback sensor which is transmitted to controller 12. Controller 12 may command opening of the EGR valve 143 based on the pressure in the EGR passage in combination with other input such as engine load, speed, and temperature. While constant EGR flow is desirable to suppress NOx formation, under certain conditions, the EGR valve 143 is maintained closed. For example, during cold starts, exhaust gas pressure is low and as a result, the EGR valve 143 is kept closed to allow gas pressure to accumulate. Similarly, during engine operation under zero load, such as idling, the EGR valve 143 is closed. Allowing EGR to flow during engine idling may lead to combustion instability and erratic idling. Furthermore, during engine operation under peak loads, e.g., the engine is operating close to or at maximum load, dilution at the combustion chamber due to EGR is not desired due to the diminished power output resulting from burning a gas mixture with lower oxygen concentration. Thus during high engine loads, the EGR valve 143 is also closed.

It will be appreciated that while the embodiment of FIG. 1 shows high pressure EGR (HP-EGR) via an HP-EGR passage coupled between the engine intake downstream of the turbocharger compressor and the engine exhaust upstream of the turbine, in alternate embodiments, the engine may be configured to also provide low pressure EGR (LP-EGR) being provided via an LP-EGR passage coupled between the engine intake upstream of the turbocharger compressor and the engine exhaust downstream of the turbine. In one example, an HP-EGR flow may be provided under conditions such as the absence of boost provided by the turbocharger, while an LP-EGR flow may be provided during conditions such as in the presence of turbocharger boost and/or when an exhaust gas temperature is above a threshold. When distinct HP-EGR and LP-EGR passages are included, the respective EGR flows may be controlled via adjustments to respective EGR valves.

Controller 12 is shown in FIG. 1 as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and manifold absolute pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold. Still other sensors may include fuel level sensors and fuel composition sensors coupled to the fuel tank(s) of the fuel system.

Storage medium read-only memory 110 can be programmed with computer readable data representing instructions executable by processor 106 for performing the methods described below as well as other variants that are anticipated but not specifically listed.

In this way, the system of FIG. 1 enables a method of operating an engine wherein a desired engine dilution is provided by combining a plurality of engine diluents, the diluents selected based on respective combustion stability limits.

An HP-EGR system may rely on a pressure differential, as determined by sensors such as the EGR sensor 145 and MAP sensor 124 of FIG. 1, to induce flow of exhaust gas from an exhaust manifold to an intake manifold of an engine. The pressure differential is also an engine pressure differential and in order for EGR flow to occur, a pressure at the exhaust manifold is higher than a pressure at the intake manifold. As such, the pressure in an EGR passage upstream of an EGR valve, such as EGR valve 143 of FIG. 1, is lower than the pressure in the passage downstream of the EGR valve. In order to build higher pressure within the EGR passage than in the intake manifold during low or no boost demands, pressure is accumulated upstream of an exhaust turbine, between the turbine and an exhaust valve in the exhaust passage, with reference to exhaust turbine 176 and EGR valve 143 of FIG. 1. The exhaust passage may be fluidly coupled to the EGR passage so that the pressure within the exhaust passage is also the pressure in the EGR passage. By adjusting compressor operation, the amount of exhaust gas, and hence exhaust gas pressure used to drive the turbine, may be modified, allowing for control over the exhaust gas pressure in the exhaust passage and EGR passage. Furthermore, adjusting compressor operation and efficiency may reduce the pressure at the intake manifold. An example of a compressor adapted with elements to vary the performance of the compressor is shown in FIGS. 2A-2B.

A first cut-away view 200 of a wide range active compressor 202, hereafter referred to as compressor 202, is depicted in FIG. 2A and a second cut-away view 250 is illustrated in FIG. 2B. The compressor 202 may be a compressor in a VGT, coupled to a turbine adapted with guiding vanes in a turbine nozzle. Compressor 202 is a non-limiting example of compressor 174 of FIG. 1. The compressor 202 comprises central axis 204 that may also be a central axis of rotation of an impeller 206, e.g., impeller wheel. A direction of air flow into the compressor 202 is indicated by an arrow 208. The direction of flow may be a reference for the positioning of elements in reference to one another. An element in the path of air flow relative to a reference point is considered downstream of that reference point and an element before the reference point in the path of air flow is considered to be upstream of the said reference point. For example, the impeller 206 is upstream of a diffuser 210 while the diffuser 210 is downstream of the impeller 206.

The most upstream end of the compressor 202 includes an inlet conduit 212 and an outer housing 214 that encloses the compressor 202. A casing 216 is disposed within the inlet conduit 212, circumferentially surrounding an intake passage 218 of the compressor 202. Air flowing into the intake conduit 212 may travel through the intake passage 218 and come into contact with the impeller 206 arranged at a downstream end of the casing 216. The impeller 206 has a hub 220, a plurality of blades 222, and a drive shaft 224 connecting the impeller 206 to a turbine, such as turbine 176 of FIG. 1.

An outlet end of the compressor may be defined as elements of the compressor 202 positioned downstream of a leading edge 226 of the impeller 206. The compressor outlet may include the diffuser 210 and a volute 228. Air that is drawn into the compressor 202 by the rotation of the impeller 206 is accelerated through the diffuser 210 and collected in the volute 228. Deceleration of gas flow in the volute 228 may cause an increase in pressure in the volute 228, resulting in gas flow to an intake manifold of an engine.

The amount of air that is boosted by the compressor 202 and delivered to the intake manifold and the efficiency of the compressor 202 during low mass flow may be controlled by incorporating elements into the structure of the compressor 202. The casing 216 may be adapted with an active casing treatment including a recirculation slot 230, a surge slot 232, a choke slot 234, and a slideable sleeve 236 surrounding the casing 216. The slideable sleeve 236 has a port 238 that is configured to align with the surge slot 232 so that the surge slot 232 is open to air flow therethrough while the choke slot is 234 blocked by the slideable sleeve 236 in a first position as shown in FIG. 2A. The slideable sleeve 236 may be adjusted to a second position shown in FIG. 2B where the surge slot 232 is blocked and the choke slot 234 is open to air flow therethrough. Movement of the slideable sleeve 236 may be effected by an actuating mechanism 246, such as an electric motor, receiving commands from a controller 248.

It will be appreciated that the compressor 202 of FIGS. 2A-2B configured with the slideable sleeve 236 is a non-limiting example of an active casing treatment component to regulate flow between the surge slot 232 and choke slot 234. Other elements may be used in place of the slideable sleeve 236 to alternate air flow between the surge slot 232 and choke slot 234 without affecting the function of the active casing treatment, such as a flap valve.

The recirculation slot 230, surge slot 232, and choke slot 234 may fluidly couple the intake passage 218 to a recirculation passage 240 formed from a space between the casing 216 and the outer housing 214. The recirculation slot 230 remains open in either of the first and second positions of the slideable sleeve 236 shown in FIGS. 2A and 2B and allows air flow through in both a downstream direction and an upstream direction. In contrast, the surge slot and choke slot are positioned such that air flow through the surge slot 232 and choke slot 234 is unidirectional and opposite of one another.

For example, the first position of the active casing treatment shown in FIG. 2A shows air flowing in a direction indicated by arrows 242 through the surge slot 232 and the port 238 of the slideable sleeve 236 from a region adjacent to the leading edge 226 of the impeller 206 and through the recirculation passage 240. Air flowing along this path travels in a direction opposite from flow into the inlet conduit 212 and through the intake passage 218. The recirculated air is returned to the intake passage 218 via the recirculation slot 230 to flow again to the impeller 206. By opening the surge slot 232 during low mass flow conditions that lead to compressor surge, a portion of the air flowing through the compressor may be channeled through the surge slot 232 and recirculated to the intake passage 218. A pressure gradient across the compressor may be alleviated by bleeding the air from the outlet end of the compressor through the surge slot 232, the pressure gradient effectively driving air flow through the recirculation passage in the reverse direction relative to flow through the compressor 202.

During low engine speeds and low mass flow into the compressor 202, the active casing treatment of the compressor 202 is often adjusted and maintained in the first position shown in FIG. 2A to prevent compressor surge. However, when engine speed is high and the compressor is subjected to high mass flow beyond the tolerance of the turbocharger, the rotational speed of the turbine may be higher than the maximum rated speed of the turbocharger. This leads to compressor choke which may limit engine torque. During such over speed events, the active casing treatment may be adjusted to block the surge slot 232 and open the choke slot 234, positioned downstream of the surge slot 232, as shown in FIG. 2B. The region downstream of the surge slot 232 may experience low pressure during operating conditions approaching compressor choke, driving a flow of air from the intake passage 218 through the recirculation slot 230 into the recirculation passage 240, through the choke slot 234, and into the outlet end of the compressor 202. The direction of flow is indicated by arrows 244 and follows the same direction as flow through the intake passage 218. This path may be a short-cut for additional air flow to reach the compressor outlet, thereby avoiding compressor choke.

The aspects of the active casing treatment described above may improve compressor efficiency by increasing the range of conditions through which compressor operation remains stable. During conditions where high compressor efficiency may hinder EGR flow and the compressor is not operating near a surge limit, e.g., within a threshold of the surge limit such as 10%, however, reducing compressor efficiency may be desirable. Thus, while the active casing treatment may be typically maintained in the first position of FIG. 2A to alleviate compressor surge, during some conditions where HP-EGR flow may be hindered, compressor efficiency may be moderated (e.g., intentionally reduced) by actuating the active casing treatment to the second position of FIG. 2B, such as during low engine speeds and low mass flow through the compressor 202. If the compressor is operating within a threshold of the surge limit, however, the active casing treatment may be maintained in the first position of FIG. 2A regardless of the status of HP-EGR flow.

The actuation to the second position may also occur during high engine speeds and mass flow conditions. Mass flow into the compressor inlet is reduced as air is diverted to the compressor outlet through the recirculation passage 240 and choke slot 234, decreasing compressor efficiency. In response, the controller may command the closing of the vanes of the VGT so that the air stream velocity through the turbine nozzle increases, allowing the turbine to spin faster. By restricting gas flow to the turbine, pressure in the exhaust passage upstream of the turbine may build. The pressure in the EGR passage increases accordingly, driving a pressure differential between the exhaust passage and intake manifold that allows exhaust gas to flow through the EGR passage to the engine intake manifold.

The WRAC of FIGS. 2A-2B adapted with an active casing treatment comprises elements that may effectively regulate EGR flow. Another example of a WRAC is shown in FIGS. 3A-3B, configured with a variable inlet device instead of an active casing treatment. In this embodiment, compressor efficiency may be reduced by adjusting the amount of air flow into the compressor.

A first cut-away view 300 of a compressor 302 is shown in FIG. 3A with a variable inlet device 304 in a first position and a second cut-away view 350 of the compressor 302 is shown in FIG. 3B with the variable inlet device (VID) 304 in a second position. The compressor 302 has a central axis 306 which may also be a central axis of rotation of an impeller 308. The direction of air flow into the compressor 302 is indicated by an arrow 310. Compressor 302 is a non-limiting example of compressor 174 of FIG. 1.

The compressor 302 has an inlet conduit 312 with an intake passage 314 surrounded by an outer housing 316. The impeller 308 is arranged at a downstream end of the intake passage 314 and includes a hub 318, a plurality of blades 320, and drive shaft 322 connecting the impeller 308 to a turbine. A diffuser 324 and a volute 326 are positioned downstream of the impeller 308 at an outlet end of the compressor 302.

Returning to discussion of an inlet end of the compressor 302, the VID 304 may be arranged in the inlet conduit 312, extending across an entire width, defined in a direction perpendicular to the central axis 306, of the intake passage 314. The VID 304 may comprise a plurality of blades 328 that are thin shells, arranged in a ring around the central axis 306 so that the VID 304 has an annular cross-section, taken in a plane perpendicular to the central axis 306. The plurality of blades 328 may be connected by hinges at an inlet end 330 of the VID 304. The plurality of blades 328 may be swung about the hinges at the inlet end 330 so that downstream ends of the plurality of blades 328 may be pivoted towards the central axis 306, as shown in FIG. 3A, into a closed position, or pivoted away from the central axis 306, as shown in FIG. 3B, in an open position. In the closed position, the downstream ends of the plurality of blades 328 overlap so that a diameter of the VID 304, measured in a direction perpendicular to the central axis 306, may be narrower at an outlet end 332 than the inlet end 330. The narrowing of the diameter of the VID 304 reduces a flow area into the compressor 302. During compressor operation at low engine speeds and low mass flow, the VID 304 is often adjusted to the closed position to prevent compressor surge and improve compressor efficiency.

In the open position shown in FIG. 3B, the diameter of the VID 304 is the same at the inlet end 330 as at the outlet end 332. The thinness of the plurality of blades 328, as well as the uniform diameter of the VID 304 in the open position present minimal restriction to air flow. Thus the VID 304 may be adjusted to the open position during high engine speeds and high mass flow in to the compressor 302 to avoid compressor choke. In one example, pivoting of the plurality of blades 328 between the closed and open positions is actuated by a motor 334 receiving commands from a controller 336. By adjusting the VID 304 position, and hence the entry air flow area into the compressor 302, in response to vehicle operating conditions, the efficiency and performance of the compressor may be improved during high engine speeds and high compressor loading.

However, as discussed above, high compressor efficiency may degrade EGR flow, diminishing the desirable effects of HP-EGR systems such as reducing engine knock and NOx emissions, improving fuel economy, etc. By reducing compressor efficiency, a sufficient pressure differential between the exhaust manifold and intake manifold of the engine may allow HP-EGR to function. Compressor efficiency may be lowered by adjusting the VID 304 into the open position of FIG. 3B during low engine speed and low mass flow into the compressor 302.

When the HP-EGR system is activated during low engine torque and boost demands, the closed position of the VID 304 that accommodates low engine speeds and low mass flow may be a nominal operating position of the VID 304. By increasing the entry air flow area through the compressor 302 via actuation of the VID 304 to the open position, compressor efficiency is reduced. The VGT may close to increase the air stream velocity through the turbine nozzle, allowing more pressure to accumulate upstream of the turbine in the exhaust passage and the EGR passage. The pressure gradient between the intake manifold and exhaust manifold may become sufficiently high to drive exhaust gas to flow to the intake manifold.

In the example shown in FIGS. 3A-3B, the restriction of flow through an inlet conduit of the compressor 302 is performed by the VID 304. It will be appreciated, however, that alternatives to the VID 304 may also regulate compressor entry flow area. For example, variable inlet guiding vanes or variable inlet devices of different shapes and sizes may be similarly positioned in the compressor inlet to adjust the area of flow. The VID 304 shown in the present disclosure is a non-limiting example of a device to vary the area into the compressor.

The EGR flow in a HP-EGR system may be more efficiently activated by reducing compressor efficiency by either adjusting the direction of flow through a recirculation passage in a compressor inlet or by controlling the flow area entering the compressor or more specifically the trim or area ratio of the area of the compressor wheel inlet versus the outlet. Example operations of a first method 400 for operating an engine system comprising a variable geometry turbocharger (VGT) including a WRAC adapted with an active casing treatment, such as the active casing treatment of FIGS. 2A-2B, is provided at FIG. 4. A second method 500 comprising a VGT including a WRAC adapted with a variable inlet device, such as VID 304 of FIGS. 3A-3B, is illustrated at FIG. 5. Instructions for carrying out methods 400, 500, and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

Figure 4:
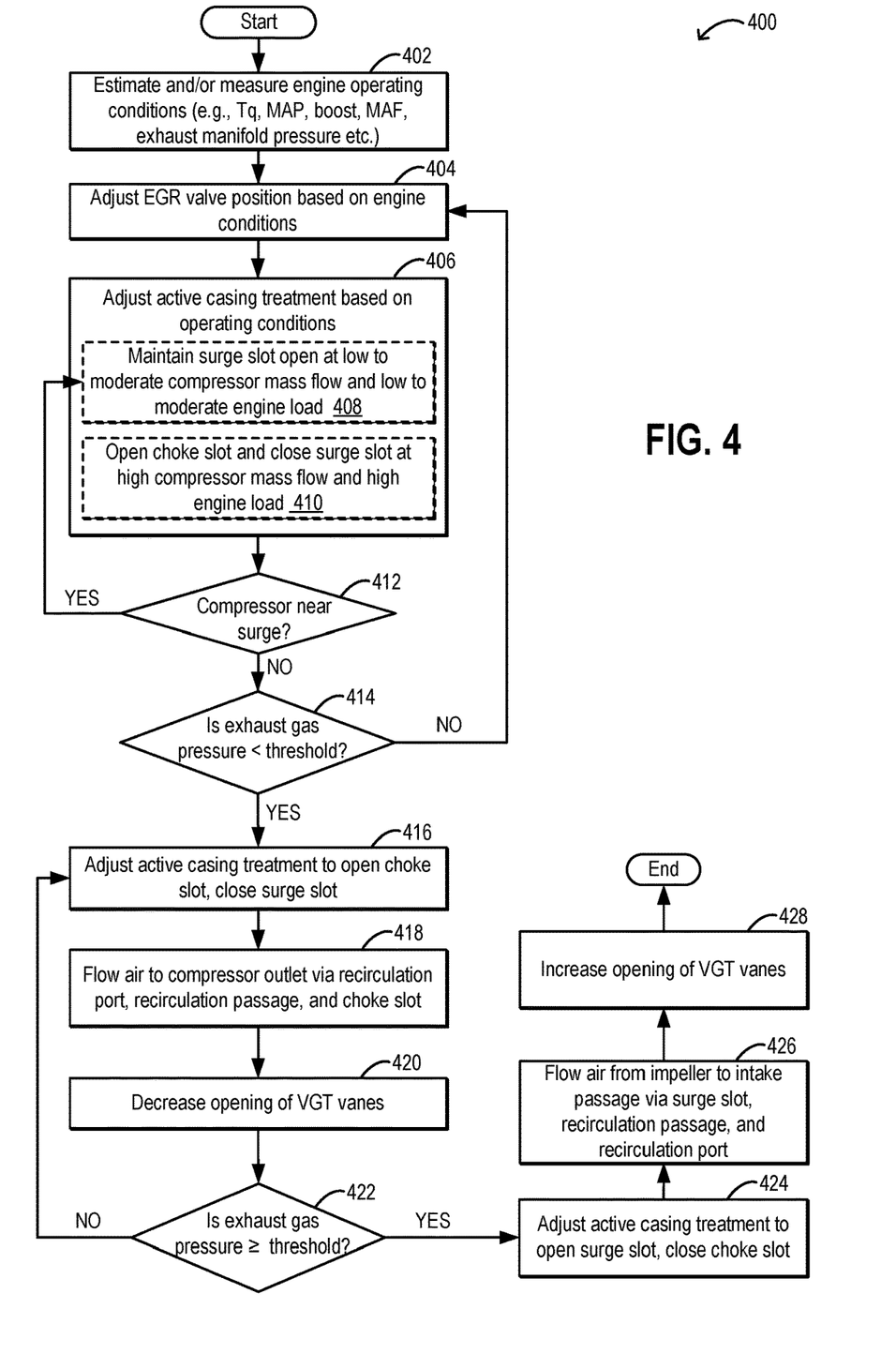
FIG. 4 is a flow chart of a first example method for operation of an engine system adapted with a wide range active compressor and a HP-EGR system.

Turning now to FIG. 4, at 402 the operating conditions of the engine may be estimated and/or measured. These may include, for example, engine speed and load, torque demand, MAP, MAF, boost pressure, exhaust manifold pressure, etc. At 404, EGR valve position may be adjusted based on the estimated or measured engine conditions. For example, the EGR valve may be adjusted according to a look-up table that indexes engine speed and load to EGR valve position, where the EGR valve may be opened if engine load is between a minimum threshold (such as 10 or 15% of maximum rated load) and a maximum threshold (such as 90% of maximum rated load). The EGR valve may be closed during idle, cold start, and/or maximum load conditions to avoid combustion instability. A difference between the exhaust manifold pressure and the MAP may also determine the positioning of the EGR valve as an alternative to or in combination with the engine load. If the exhaust manifold pressure exceeds the MAP by an amount that creates a pressure differential sufficient to drive EGR flow, the EGR valve may be opened. However, if engine load, and consequently boost demand, rises, the EGR valve may be closed until the exhaust manifold pressure increases to accommodate both a higher boost pressure and EGR flow simultaneously. Furthermore, the amount that the EGR valve is opened may also depend on engine load.

At 406 of the method, the active casing treatment (ACT) may be adjusted based on engine operating conditions. During low to moderate engine loads and low to moderate compressor mass flow, the ACT may be configured to open a surge slot at 408, allowing air to recirculate from the impeller, through the surge slot and a recirculation passage and to the intake passage through a recirculation port in a casing of the compressor inlet. Alternatively, at 410, the ACT may be adjusted to open a choke slot, blocking the surge slot, during high compressor mass flow and high engine loads approaching a compressor choke limit. By opening the choke slot, additional air is delivered to the compressor outlet through the recirculation port, recirculation passage, and choke slot.

The method may then determine at 412 if the compressor is near a surge limit. The compressor may approach surge conditions if a surge margin of compressor operation, e.g., pressure ratio across the compressor as a function of mass flow, decreases so that the compressor is operating within a threshold of the surge limit. In one example, the threshold may be within 5% of the surge limit. If the compressor is operating within a threshold of the surge limit, the method returns to 408 to continue operation with the surge slot open.

If the compressor is not within a threshold of the surge limit, the method proceeds to 414 to determine if the exhaust gas pressure is less than a threshold pressure. The pressure of the exhaust gas may be determined by a pressure sensor arranged in the exhaust manifold or by an EGR sensor, such as EGR sensor 145 of FIG. 1, disposed in an EGR passage. The threshold pressure may be a non-zero, positive value that is a minimum pressure at which the amount of exhaust gas available is sufficient to drive a desired boost pressure, as according to engine conditions, and maintain the pressure differential driving EGR flow. In one example, the threshold pressure may vary based on the amount of boost requested. During lower boost demands, the threshold pressure may be reduced compared to events where higher boost is desired. When boost demand is increased, the threshold pressure may be elevated. As another example, the threshold pressure may be a function of the intake manifold pressure. When the intake manifold pressure is low, the threshold pressure may also be lowered and when the intake manifold pressure rises, the threshold pressure increases accordingly. The threshold pressure may vary in response to a combination of engine conditions and may be determined at a controller, such as controller 12 of FIG. 1, according to look-up tables or data conveying relationships between engine variables (e.g., according to a look-up table that indexes the threshold exhaust pressure as a function of boost pressure).

If the exhaust gas pressure is at or greater than the threshold, e.g., not lower than the threshold, the method returns to 404 to adjust the EGR valve position based on engine conditions. Because the exhaust pressure is sufficiently high to drive EGR, the EGR valve and the ACT may continue to be adjusted based on operating conditions as described above. However, if the exhaust gas pressure is below the threshold, the method proceeds to 416 and the controller sends a signal to adjust the active casing treatment to open the choke slot and block the surge slot. Air is flowed via a short-cut path at 418, from the intake passage through the recirculation slot, recirculation passage, and choke slot to the compressor outlet, thereby reducing compressor efficiency. At 420 the diminished compressor efficiency actuates an adjustment of turbine nozzle vanes of the VGT so that the openings between the vanes are narrowed, decreasing exhaust gas flow into the turbine. By decreasing gas flow through the turbine nozzle, pressure may accumulate upstream of the turbine.

At 422, the method determines if the exhaust gas pressure is equal to or greater than the pressure threshold pressure (e.g., the threshold pressure of 414). If the exhaust gas pressure does not reach the threshold, the method returns to 416 to continue flowing air to the compressor outlet with the choke slot open and surge slot closed. Further, in some examples, if opening the choke slot/maintaining the choke slot open does not result in sufficient exhaust pressure to drive HP-EGR, the engine may be throttled to reduce intake manifold pressure to drive the HP-EGR. Throttling the engine may include reducing a degree of opening of the intake throttle, for example. If the exhaust gas pressure is determined to at least match the threshold, the method proceeds to adjust the ACT to open the surge slot and close the choke slot at 424. Air is recirculated in the compressor from the impeller to the intake passage via the surge slot, recirculation passage, and recirculation port. In response to the increased compressor efficiency, the vanes of the VGT are adjusted at 428 so that the vane openings are widened and exhaust gas flow into the turbine is increased.

Method 500 of FIG. 5 may operate following similar steps to those of method 400. At 502 the operating conditions of the engine may be estimated and/or measured. These may include, for example, engine speed and load, torque demand, MAP, MAF, boost pressure, exhaust manifold pressure, etc. At 504, EGR valve positioned may be adjusted based on the estimated or measured engine conditions. For example, the EGR valve may be adjusted according to a look-up table that indexes engine speed and load to EGR valve position, where the EGR valve may be opened if engine load is between a minimum threshold (such as 10 or 15% of maximum rated load) and a maximum threshold (such as 90% of maximum rated load). The EGR valve may be closed during idle, cold start, and/or maximum load conditions to avoid combustion instability or limiting engine performance. A difference between the exhaust manifold pressure and the MAP may also determine the positioning of the EGR valve as an alternative to or in combination with the engine load. If the exhaust manifold pressure exceeds the MAP by an amount that creates a pressure differential sufficient to drive EGR flow, the EGR valve may be opened. However, if engine load, and consequently boost demand, rises, the EGR valve may be closed until the exhaust manifold pressure increases to accommodate both a higher boost pressure and EGR flow simultaneously. Furthermore, the amount that the EGR valve is opened may also depend on engine load.

At 506 of the method, the variable inlet device (VID) may be adjusted based on engine operating conditions. During low to moderate engine loads and compressor mass flow, the VID may be actuated to a closed position, reducing flow area into the compressor and improving compressor efficiency by increasing compressor operating points outside of a surge limit. Alternatively, at 510, the VID may be actuated to an open position during high compressor mass flow and high engine loads approaching a compressor choke limit. By adjusting the VID to the open position, flow area through the compressor is increased, avoiding compressor operation beyond the choke limit.

The method may then determine at 512 if the compressor is near a surge limit. The compressor may approach surge conditions if a surge margin of compressor operation, e.g., pressure ratio across the compressor as a function of mass flow, decreases so that the compressor is operating within a threshold of the surge limit. In one example, the threshold may be within 5% of the surge limit. If the compressor is operating within a threshold of the surge limit, the method returns to 508 to continue operation with the surge slot open.

If the compressor is not within a threshold of the surge limit, the method proceeds to 514 to determine if the exhaust gas pressure is less than a threshold pressure. The pressure of the exhaust gas may be determined by a pressure sensor arranged in the exhaust manifold or by the EGR sensor disposed in an EGR passage. The threshold pressure may be a non-zero, positive value that is a minimum pressure at which the amount of exhaust gas available is sufficient to drive a desired boost pressure, as according to engine conditions, and maintain the pressure differential driving EGR flow. In one example, the threshold pressure may vary based on the amount of boost requested. During lower boost demands, the threshold pressure may be reduced compared to events where higher boost is desired. When boost demand is increased, the threshold pressure may be elevated. As another example, the threshold pressure may be a function of the intake manifold pressure. When the intake manifold pressure is low, the threshold pressure may also be lowered and when the intake manifold pressure rises, the threshold pressure increases accordingly. The threshold pressure may vary in response to a combination of engine conditions and may be determined at a controller, such as controller 12 of FIG. 1, according to look-up tables or data conveying relationships between engine variables (e.g., according to a look-up table that indexes the threshold exhaust pressure as a function of boost pressure).

If the exhaust gas pressure is at or greater than the threshold, e.g., not lower than the threshold, the method returns to 504 to adjust the EGR valve position based on engine conditions. Because the exhaust pressure is sufficiently high to drive EGR, the EGR valve and the VID may continue to be adjusted based on operating conditions as described above. However, if the exhaust gas pressure is below the threshold, the method proceeds to 516 and the controller sends a command to adjust the VID to the open position. Flow area through the compressor is increased at 518, thereby reducing compressor efficiency. At 520 the diminished compressor efficiency actuates an adjustment of turbine nozzle vanes of the VGT so that the openings between the vanes are narrowed, increasing the pressure drop over the engine. By decreasing gas flow through the turbine nozzle, pressure may accumulate upstream of the turbine.

At 522, the method determines if the exhaust gas pressure is equal to or greater than the pressure threshold pressure (e.g., the threshold pressure of 514). If the exhaust gas pressure does not reach the threshold, the method returns to 516 to continue flowing air to the compressor outlet with the VID in the open position. Further, in some examples, if the VID being in the open position does not result in sufficient exhaust pressure to drive HP-EGR, the engine may be throttled to reduce intake manifold pressure to drive the HP-EGR. Throttling the engine may include reducing a degree of opening of the intake throttle, for example. If the exhaust gas pressure is determined to at least match the threshold, the method proceeds to 524 to adjust the VID to the closed position. Flow area through the compressor is decreased as a result of the narrowing of an outlet end of the VID at 526. In response to the increased compressor efficiency, the vanes of the VGT are adjusted at 528 so that the vane openings are widened and pressure drop over the engine is decreased.

An example map 600 is shown in FIG. 6 for adjusting a wide range active compressor (WRAC) in an engine system of a vehicle to regulate HP-EGR flow during engine operation. Map 600 depicts engine load at plot 602, an engine pressure differential between an exhaust manifold an intake manifold at plot 604, and a position of an EGR valve controlling HP-EGR flow at plot 606. A positioning of the WRAC between a first position and a second position is shown at plot 608. When the WRAC is configured with an active casing treatment (ACT), the first position may be an adjustment of the ACT to open a surge slot and close a choke slot, circulating air from an impeller to an intake passage of the WRAC, and the second position may an adjustment of the ACT to open the choke slot and close the surge slot, flowing additional air from an inlet end to an outlet end of the WRAC. When the WRAC is configured with a variable inlet device (VID), the first position may comprise adjusting the VID to a closed position, reducing a flow area of the intake passage, and the second position may comprise adjusting the VID to an open position, increasing the flow area of the intake passage relative to the closed position. A pressure ratio across the WRAC is shown at plot 610. All plots are shown over time, along the x-axis. Thresholds are indicated by dashed horizontal lines. For example, plot 604 includes a minimum pressure differential threshold 612, indicating a minimum pressure differential below which EGR may not flow. In another example, plot 610 includes a surge limit 614 and a choke limit 616 of the WRAC.

Prior to t1, the engine is operating under moderate loads (plot 602) and the engine pressure differential (plot 604) is above the minimum threshold. The EGR valve (plot 606) is open to allow exhaust gas to recirculate from the exhaust manifold to downstream of the WRAC while the WRAC is in the first position (plot 608) to maintain high compressor efficiency with respect to reducing likelihood of compressor surge. The pressure ratio of the WRAC (plot 610) is in a stable region between the surge and choke limits until, at t1, engine load decreases and the engine pressure differential drops below the minimum threshold 612 for driving HP-EGR flow. Engine load decreases as a result of a slowing of the vehicle commanded by an operator or a lower demand for engine torque, such as when the vehicle is moving along a downhill slope. Concomitantly, the amount of exhaust gas produced at the engine cylinders is reduced, leading to a decrease in exhaust manifold pressure while the compressor pressure ratio remains in the stable region.

At t1, the WRAC is adjusted to the second position to reduce compressor efficiency. Between t1 and t2, the adjustment of the WRAC to the second position results in an increase in the engine pressure differential, allowing the pressure differential to eventually rise above the minimum threshold 612 for HP-EGR flow and allowing HP-EGR flow to resume. Conditions are maintained until, at t2, engine load rapidly decreases, such as in response to an operator tip-out, and the compressor pressure ratio rises to approach the surge limit.

At t2, as compressor operation reaches the surge limit, the engine pressure differential decreases to fall below the minimum threshold 612 for EGR flow due to a reduction in exhaust pressure in the exhaust manifold. The EGR valve is closed and the WRAC is adjusted to the first position to increase compressor efficiency and increase a surge margin. Between t2 and t3, the compressor pressure ratio gradually decreases until the surge margin increases beyond a threshold of the surge limit 614 at t3. For example, the threshold may be 5-10% of a maximum pressure ratio of the WRAC.

At t3, as the compressor margin to surge is widened and the compressor pressure ratio returns to a stable region, the engine pressure differential rises above the minimum threshold 612 as engine load is slightly increased. The EGR valve is opened, resuming HP-EGR flow, and the WRAC is maintained in the first position. Engine load rapidly rises between t3 and t4, for example, in response to an operator tip-in, while the compressor pressure ratio quickly decreases. The engine pressure differential also decreases, dropping below the minimum threshold 612 for HP-EGR flow at t4.

At t4, the WRAC choke margin is decreased so that compressor pressure ratio is reduced to the choke limit 616. The EGR valve is closed and the WRAC is adjusted to the second position. By adjusting the WRAC to the second position, the WRAC pressure ratio is gradually increased even though the engine load continues to rise for a period between t4 and t5. Between t4 and t5, the compressor pressure ratio rises until the choke margin increases beyond a threshold of the choke limit at t5. For example, the threshold may be 5-10% of a maximum pressure ratio of the WRAC.

The engine pressure differential also increases, passing the minimum threshold for HP-EGR flow at t5 as engine load decreases. The EGR valve is opened at t5 while the WRAC is maintained in the second position to promote HP-EGR flow with the WRAC operating in a stable region between the surge and choke limits.

In this way, EGR flow may be maintained or increased during low engine speeds and/or low loads by adapting an engine system with a turbocharger comprising a wide range active compressor (WRAC). The WRAC may be configured with an active casing treatment including a surge slot, choke slot, recirculation passage, and recirculation slot. By adjusting the active casing treatment to open the choke slot when a pressure differential between an exhaust manifold and an intake manifold of the engine is not high enough to induce sufficient EGR flow, compressor efficiency is reduced and pressure may accumulate upstream of a turbine by closing the VGT vanes. The buildup of pressure in an exhaust passage upstream of the turbine also occurs in an EGR passage that is coupled to the exhaust passage and the increased pressure differential between the exhaust manifold and the intake manifold induces flow of exhaust gas to the engine intake.

The adjusting of the active casing treatment to open the choke slot during conditions where the choke slot would otherwise be closed (e.g., during mid to low load conditions) in order to drive EGR may be performed only when the pressure differential between the exhaust system (e.g., the exhaust passage upstream of the turbine) and the intake system (e.g., the intake manifold) is less than a threshold for supplying sufficient EGR and when the compressor is operating outside of surge conditions (e.g., to the right of a surge line on a compressor map). Thus, during a first operating condition where the engine is operating with engine load in a first load range (such as between 30% and 75% of maximum rated load) and the pressure differential between the exhaust system and the intake system is greater than a threshold differential, the choke slot may be maintained closed to maintain compressor efficiency. During a second operating condition where the engine is operated with engine load in the first load range and the pressure differential between the exhaust system and the intake system is not greater than the threshold differential, the choke slot may be opened to reduce compressor efficiency and allow the VGT vanes to be opened, thereby increasing exhaust pressure and driving EGR. The engine load may be substantially similar during the first operating condition and the second operating condition, at least in some examples, while one or more other operating parameters may be different between the first operating condition and the second operating condition. Such differing operating parameters may include camshaft timing, low-pressure EGR flow rate, commanded boost pressure, compressor mass flow, and particulate filter load. For example, the first operating condition may include operating the engine with a compressor mass flow below a threshold mass flow and the second operating condition may include operating the engine with a compressor mass flow above the threshold mass flow. In this way, during low compressor flow conditions where the compressor may be prone to surge, the surge slot may be opened while during higher compressor flow conditions where the compressor is not prone to surge and when the engine pressure differential is relatively low (e.g., too low to sufficiently drive EGR), the surge slot may be blocked and the choke slot may be opened. Once the engine pressure differential increases to a level where EGR may be driven sufficiently, the surge slot may be opened and the choke slot may be blocked to increase compressor efficiency, at least until engine speed and/or load increases to a point where turbocharger choke may occur, at which point the choke slot may be opened.

In another example, the first operating condition may include operating the engine with a particulate filter soot load above a threshold soot load and the second operating condition may include operating the engine with a particulate filter soot load below the threshold soot load. If a particulate filter has a relatively high soot load (e.g., above the threshold soot load), exhaust pressure may be increased relative to when the particulate filter has a relatively low soot load. The increased exhaust pressure during high soot load conditions may help drive EGR, thus adjustment of the active casing treatment to open the choke slot to drive EGR may not be performed. If the particulate filter is then regenerated, exhaust pressure may drop such that sufficient pressure differential is not present to drive EGR. As a result, the active casing treatment may be adjusted to open the choke slot, even if engine load is not high enough to cause the choke slot to be opened to avoid turbocharger choke.

In another embodiment of the WRAC, a variable inlet device may be disposed in an inlet conduit of the WRAC. The variable inlet device may be adjusted to an open position during low engine speeds and low mass flow into the compressor to increase flow area into the compressor. As a result, compressor efficiency is reduced, allowing pressure to increase upstream of the turbine and enhancing the pressure differential between the exhaust manifold and the intake manifold so that EGR flow is not impeded. The technical effect of reducing compressor efficiency during low engine speeds is that NOx emissions are reduced.

FIGS. 1-3B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

In one example, a method includes decreasing compressor efficiency and increasing a pressure differential between an exhaust system upstream of a turbine and an intake system downstream of a compressor and, responsive to increasing the pressure differential, opening an exhaust gas recirculation (EGR) valve to flow exhaust gas from the exhaust system to the intake system. In a first example of the method, the turbine is a variable geometry turbine and wherein increasing the pressure differential comprises closing one or more vanes of the variable geometry turbine in response to decreasing the compressor efficiency. A second example of the method optionally includes the first example and further includes wherein decreasing compressor efficiency comprises adjusting an active casing treatment of the compressor to open a choke slot of the active casing treatment, thereby flowing intake air to an impeller of the compressor via an intake passage of the compressor and via the choke slot. A third example of the method optionally includes one or more of the first and second examples, and further includes, wherein decreasing compressor efficiency and increasing the pressure differential comprises decreasing compressor efficiency and increasing the pressure differential responsive to the pressure differential being less than a threshold differential. A fourth example of the method optionally includes one or more of the first through third examples, and further includes, responsive to the pressure differential being equal to or greater than the threshold differential, increasing or maintaining compressor efficiency by adjusting the active casing treatment to block the choke slot. A fifth example of the method optionally includes one or more of the first through fourth examples, and further includes, wherein decreasing compressor efficiency comprises opening a variable inlet device positioned in an inlet conduit of the compressor. A sixth example of the method optionally includes one or more of the first through fifth examples, and further includes, wherein decreasing compressor efficiency and increasing the pressure differential comprises decreasing compressor efficiency and increasing the pressure differential responsive to the pressure differential being less than a threshold differential. A seventh example of the method optionally includes one or more of the first through sixth examples, and further includes, further comprising responsive to the pressure differential being equal to or greater than the threshold differential, increasing or maintaining compressor efficiency by closing the variable inlet device.

In one example, a system includes a turbocharger including a variable geometry turbine coupled to a wide range active compressor, a high-pressure exhaust gas recirculation (HP-EGR) system comprising an EGR passage coupled upstream of the variable geometry turbine and downstream of the wide range active compressor and an EGR valve position in the EGR passage, and a controller storing non-transitory instructions executable to, responsive to a pressure differential across the EGR valve being less than a threshold differential, adjust the wide range active compressor to reduce compressor efficiency, and upon reducing compressor efficiency, close one or more vanes of the variable geometry turbine. In a first example of the system, the instructions are executable to open the EGR valve responsive to the pressure differential across the EGR valve being equal to or greater than the threshold differential. A second example of the system optionally includes the first example and further includes wherein the wide range active compressor comprises an impeller and an active casing treatment at least partially surrounding the impeller, the active casing treatment including a choke slot, and wherein the instructions to adjust the wide range active casing treatment include instructions to adjust the active casing treatment to open the choke slot. A third example of the system optionally includes one or more of the first and second examples, and further includes, wherein the wide range active compressor comprises an impeller fluidically coupled to an inlet conduit and a variable inlet device positioned in the inlet conduit, and wherein the instructions to adjust the wide range active compressor include instructions to open the variable inlet device.

In another example, a method includes, responsive to operation of a wide range active compressor (WRAC) within a surge region, adjusting the WRAC to a first position to alleviate compressor surge, responsive to engine operation at an engine pressure differential less than a threshold, and operation of the WRAC outside of the surge region, adjusting the WRAC to a second position to decrease compressor efficiency and increase engine pressure differential to flow EGR, and, responsive to the engine pressure differential rising above the threshold, adjusting the WRAC to the first position to increase compressor efficiency during compressor operation outside of the surge region. In one example, the method may include determining WRAC operation within the surge region, and in response thereto adjusting the WRAC to the first position; and determining if the engine pressure differential is less than or above the threshold, and in response thereto adjusting the position of the WRAC to the second or first position. In some examples, adjusting the WRAC to the first position to alleviate surge occurs while or during determining if the engine pressure differential is less than or above the threshold, and adjusting the position of the WRAC occurs while the WRAC is not operating within a surge region and/or while or during comparison of the engine pressure differential to the threshold. In some examples the method may include determining whether to perform one or more of each of adjusting the WRAC to the first or second position based on a determination of whether the WRAC is operating within a surge region and a determining of whether if the engine pressure differential is less than or above the threshold. In a first example of the method, adjusting the WRAC to the first position to alleviate compressor surge comprises adjusting an active casing treatment of the WRAC to open a surge slot of the active casing treatment, thereby decreasing a pressure ratio of the WRAC. A second example of the method optionally includes the first example and further includes wherein adjusting the WRAC to the second position to decrease compressor efficiency comprises adjusting the active casing treatment to open a choke slot and block the surge slot. A third example of the method optionally includes one or more of the first and second examples, and further includes, wherein adjusting the WRAC to the first position to increase compressor efficiency comprises adjusting the active casing treatment to open the surge slot and block the choke slot. A fourth example of the method optionally one or more of the first through third examples, and further includes, wherein adjusting the WRAC to the first position to alleviate compressor surge comprises adjusting a variable inlet device of the WRAC to a closed position, thereby decreasing a flow area of a compressor inlet of the WRAC. A fifth example of the method optionally one or more of the first through fourth examples, and further includes, wherein adjusting the WRAC to the second position to decrease compressor efficiency comprises adjusting the variable inlet device to an open position to increase the flow area of the compressor inlet. A sixth example of the method optionally one or more of the first through fifth examples, and further includes, further comprising closing one or more vanes of a variable geometry turbine coupled to the WRAC upon adjusting the WRAC to the second position in order to increase the engine pressure differential. A seventh example of the method optionally one or more of the first through sixth examples, and further includes, wherein adjusting the wide range active compressor to the first position responsive to operation within the surge region comprises adjusting the wide range active compressor to the first position responsive to operation within the surge region independent of engine pressure differential.

In another representation, a method includes adjusting a wide range active compressor to a first position responsive to compressor operation within a surge region to alleviate compressor surge and adjusting the wide range active compressor to a second position responsive to an engine pressure differential being less than a threshold differential to drive exhaust gas recirculation.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
responsive to an exhaust manifold pressure decreasing below a threshold pressure, decreasing compressor efficiency and increasing a pressure differential between an exhaust system upstream of a turbine and an intake system downstream of the compressor; and
responsive to increasing the pressure differential, opening an exhaust gas recirculation (EGR) valve to flow exhaust gas from the exhaust system to the intake system, wherein decreasing the compressor efficiency comprises adjusting an active casing treatment of the compressor to open a choke slot of the active casing treatment, thereby flowing intake air to an impeller of the compressor via an intake passage of the compressor and via the choke slot.

2. The method of claim 1, wherein the turbine is a variable geometry turbine and wherein increasing the pressure differential comprises closing one or more vanes of the variable geometry turbine in response to decreasing the compressor efficiency.

3. The method of claim 1, wherein decreasing the compressor efficiency and increasing the pressure differential comprises decreasing the compressor efficiency and increasing the pressure differential responsive to the pressure differential being less than a threshold differential.

4. The method of claim 3, further comprising, responsive to the pressure differential being equal to or greater than the threshold differential, increasing or maintaining the compressor efficiency by adjusting the active casing treatment to block the choke slot.

5. A system, comprising:
a turbocharger including a variable geometry turbine coupled to a wide range active compressor;
a high-pressure exhaust gas recirculation (HP-EGR) system comprising an EGR passage coupled upstream of the variable geometry turbine and downstream of the wide range active compressor and an EGR valve positioned in the EGR passage; and
a controller storing non-transitory instructions executable to:
responsive to a pressure differential across the EGR valve being less than a threshold differential, adjust the wide range active compressor to reduce compressor efficiency; and
upon reducing compressor efficiency, close one or more vanes of the variable geometry turbine.

6. The system of claim 5, wherein the instructions are executable to open the EGR valve responsive to the pressure differential across the EGR valve being equal to or greater than the threshold differential.

7. The system of claim 5, wherein the wide range active compressor comprises an impeller and an active casing treatment at least partially surrounding the impeller, the active casing treatment including a choke slot, and wherein the instructions to adjust the wide range active compressor include instructions to adjust the active casing treatment to open the choke slot.

8. The system of claim 5, wherein the wide range active compressor comprises an impeller fluidically coupled to an inlet conduit and a variable inlet device positioned in the inlet conduit, and wherein the instructions to adjust the wide range active compressor include instructions to open the variable inlet device.

9. A method, comprising:
responsive to operation of a wide range active compressor (WRAC) within a surge region, adjusting the WRAC to a first position to alleviate compressor surge;
responsive to engine operation at an engine pressure differential less than a threshold, and operation of the WRAC outside of the surge region, adjusting the WRAC to a second position to decrease compressor efficiency and adjusting exhaust gas flow to a turbine to increase the engine pressure differential to flow EGR; and
responsive to the engine pressure differential rising above the threshold, adjusting the WRAC to the first position to increase compressor efficiency during WRAC operation outside of the surge region.

10. The method of claim 9, wherein adjusting the WRAC to the first position to alleviate compressor surge comprises adjusting an active casing treatment of the WRAC to open a surge slot of the active casing treatment, thereby decreasing a pressure ratio of the WRAC.

11. The method of claim 10, wherein adjusting the WRAC to the second position to decrease compressor efficiency comprises adjusting the active casing treatment to open a choke slot and block the surge slot.

12. The method of claim 11, wherein adjusting the WRAC to the first position to increase compressor efficiency comprises adjusting the active casing treatment to open the surge slot and block the choke slot.

13. The method of claim 9, wherein adjusting the WRAC to the first position to alleviate compressor surge comprises adjusting a variable inlet device of the WRAC to a closed position, thereby decreasing a flow area of a compressor inlet of the WRAC.

14. The method of claim 13, wherein adjusting the WRAC to the second position to decrease compressor efficiency comprises adjusting the variable inlet device to an open position to increase the flow area of the compressor inlet of the WRAC.

15. The method of claim 13, further comprising closing one or more vanes of a variable geometry turbine coupled to the WRAC upon adjusting the WRAC to the second position in order to increase the engine pressure differential.

16. The method of claim 9, wherein adjusting the WRAC to the first position responsive to operation within the surge region comprises adjusting the WRAC to the first position responsive to operation within the surge region independent of the engine pressure differential.

* * * * *